United States Patent [19]

Wilhelm

[11] 3,780,316

[45] Dec. 18, 1973

[54] DATA DISTRIBUTION LINE ARRANGEMENT

[75] Inventor: Wilhelm Wilhelm, Munich, Germany

[73] Assignee: Siemens Aktiengesellschaft, Berlin and Munich, Germany

[22] Filed: May 17, 1971

[21] Appl. No.: 144,074

[30] Foreign Application Priority Data

May 26, 1970 Germany .................. P 20 25 740.3

[52] U.S. Cl. ................. 307/209, 307/254, 328/205, 307/241

[51] Int. Cl. .......................................... H03k 17/00

[58] Field of Search ........................... 307/209, 250; 330/30 D; 328/104, 205

[56] References Cited

UNITED STATES PATENTS 3,450,896 6/1969 Taniguchi et al. ............. 307/208 X 3,247,323 4/1966 Carroll ............................... 307/250

3,207,922 9/1965 Gruodis et al. ..................... 307/209

*Primary Examiner*—John W. Huckert

*Assistant Examiner*—B. P. Davis

*Attorney*—Hill, Sherman, Meroni, Gross & Simpson

[57] ABSTRACT

A data distribution line arrangement with transmitting and receiving gates which are connected to a distribution line wherein the transmitting gates respectively provide data to the distribution line during unique time intervals and a transmitting gate has an output connected to the distribution line. The transmitting gate may be conditioned to three states, two of which states are characterized by a small impedance value and the third state being characterized by a large impedance value.

3 Claims, 5 Drawing Figures

INVENTOR
*Wilhelm Wilhelm*
BY
Hill, Sherman, Meroni, Gross & Simpson
ATTYS

INVENTOR
Wilhelm Wilhelm
BY
Hill, Sherman, Meroni, Gross & Simpson
ATTYS.

DATA DISTRIBUTION LINE ARRANGEMENT

DESCRIPTION

This invention relates to a data distribution system in which transmission gates and receiving gates are connected to a distribution line and only one transmission gate respectively provides data to the distribution line, and more particularly to an improved transmission gate which has two possible low output impedance states and a third possible high output impedance state.

A data distribution line, or a collecting line, is a data signal line which has a plurality of transmitters and a plurality of receivers which are distributed over a data transmission line. Particular control signals, usually provided on a time division multiplex (TDM) basis, provide that only one transmitter respectively provides data to the data transmission line. A logical linkage of several transmitter signals on the line is therefore not provided. As an example of a distribution line with connected transmitters and receivers, one may visualize a plurality of transmitting gates having their outputs connected to a line and a plurality of receiving gates each having an input connected to the line. Hereinafter, transmitters will be referred to as transmission or transmitting gates and receivers as receiving gates. Each of the transmission gates has a data input and a control input while each of the receiving gates includes a common data input via the line and respective control inputs. When respective control signals are applied to a single transmission gate and a single receiving gate, a data path is switched through these gates including the distribution line. During the data transmission interval over this data path, the control inputs of the remaining transmission gates maintain the remaining transmission gates in a closed condition. In a following time interval, a new and different data path may be established after the previous path has been disengaged.

An advantage of such a distribution line arrangement resides in the fact that one and the same line can be utilized for different data paths due to TDM operation. A single line therefore replaces the large number of normal individual signals lines. The effectiveness of such a distribution arrangement is, however, only provided when a frequent change of data paths is possible between a large number of transmitters and receivers. In such cases, however, compliance with several conditions or precircumstances is necessary. The distribution line must, for instance, be terminated with resistors with approximately correspond to the wave impedance of the line. Furthermore, the idle transmission gates and all receiving gates should represent no ohmic load, if possible. The internal impedances of the transmission gates, as seen by the transmission line, may cause signal reflections or even entire signal blockage of the line at the feed points, if the value thereof is too small. Furthermore, capacitive loads which are represented by the transmission and receiving gates should be distributed as small and evenly as possible over the data transmission line. The wave impedance of the distribution line is submitted to a variation which may be up to ± 40 percent due to the capacitances of the transmitting and receiving gates and their ohmic resistances. A reflection-free termination of the line is therefore not possible.

Hitherto, gates have been provided for the transmitting gates of data distribution lines in which one of the two logical initial states represents an idle state, that is, a non-transmitting gate or state of rest. In order to avoid the possibility of idle transmitting gates interfering with the signal on the line, the idle must be characterized by a high output impedance. An equivalent circuit diagram may be provided for such a transmitting gate which comprises a switch interposed between the line and a voltage source. In the transmitting state, the switch is closed during the transmission of a binary 1, for example, so that the voltage source is connected to the line and impresses a voltage thereon. If an information bit of a different kind is to be transmitted, such as a binary 0, the switch is opened and no voltage is impressed onto the line. In this second state, the open switch represents the idle state in which the transmission gate does not transmit.

When a transmitting gate is operated to switch from a binary 1 to a binary 0, the switch is opened and a current will first continue to flow in the distribution line. This current, together with the wave impedance of the line produces a voltage at the point of transmission which has the same polarity as the just impressed voltage. This provides that the voltage rise at the transmission location is relatively small at the moment of switching. Only when the reflections on the distribution line have faded is the potential at the transmitting location able to assume its normal value. If a receiving gate is connected to the line near the point of transmission, a relatively high voltage is therefore provided at the moment of switching, which may be erroneously interpreted by the receiving gate. In any case, the receiving gate receives the voltage, which characterizes an unambiguous information bit at a later time; therefore, the transit time of the signal on the line is increased.

The primary object of this invention is therefore to provide a transmitting gate with a voltage change which is as large as possible during switching from one kind of information bit to the other. This object is realized through the provision of a transmitting gate having an output connected to a data distribution line, which transmitting gate has three possible output states whereby the output impedance of the gate is of a small value in two of the output states and at a large value in the third output state.

Other objects, features and advantage of the invention, its organization, construction and operation will be best understood from the following detailed description of an exemplary embodiment thereof taken in conjunction with the accompanying drawings, in which.

Figure 1:
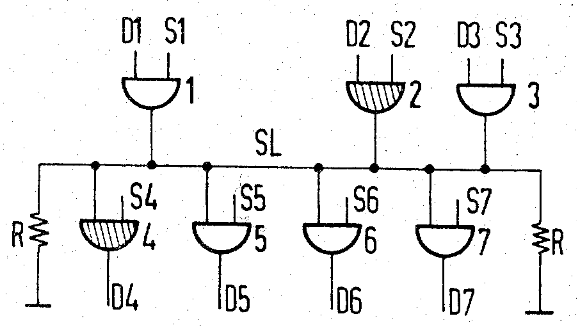
FIG. 1 is a schematic representation of a data distribution system having a plurality of transmitting gates and receiving gates connected to a distribution line.

Referring to FIG. 1, a data distribution line SL has a plurality of transmitting gates 1, 2 and 3 and a plurality of receiving gates 4, 5, 6 and 7 connected thereto. The transmitting gates 1–3 are provided with respective data inputs D1, D2 and D3 and a plurality of control inputs S1, S2 and S3. Each of the transmitting gates has an output connected to the distribution line S1 and each of the receiving gates 4–7 have an input connected to the distribution line SL. The receiving gates 4–7 are also provided with respective control signal inputs S4, S5, S6 and S7. The distribution line SL is terminated at each end with respective resistors R.

If in the arrangement of FIG. 1, binary 1's are applied during the same interval of time to the control signal inputs S2 and S4, a data path from the transmitting gate 2 to the receiving gate 4 is switched through. The control inputs of the transmission gates 1 and 3 must be at a binary 0 during this interval of time. In a following interval of time, a new connection can be established after the connection from the transmitting gate 2 to the receiving gate 4 is disengaged.

As mentioned above, the great advantage of the foregoing type of data distribution arrangement lies in the application of a single line for a number of different data paths when controlled on a TDM basis. A single line therefore replaces a number of individual signal lines. As also set forth above, it is difficult to provide such arrangements and provide accurate data interpretation at all points along the distribution line because of impedance distribution and signal reflection problems.

Figure 2:
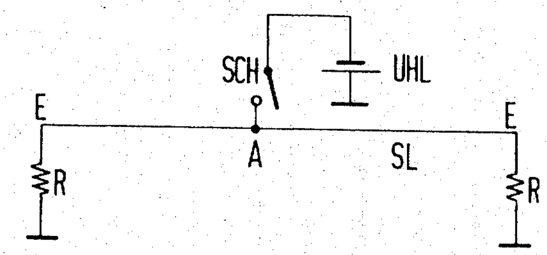
FIG. 2 is an equivalent schematic circuit diagram of a two-state transmitting gate connected to a data distribution line.

The use of a two-state transmitting gate, as hereinbefore described, is illustrated in FIG. 2. The equivalent circuit diagram of the transmitting gate consists of a switch SCH which is serially connected between a point A on the line SL and a voltage source UHL. The line SL is terminated at each of its ends E with a resistor R. If a binary 1 is to be transmitted, the switch SCH is closed and the voltage UHL is applied to the point A. If a binary 0 is to be transmitted, the switch SCH is opened again and a voltage forms at the point A, which voltage is determined by the still flowing current in the line and the wave impedance of the line. Only when current flow has terminated is the point A held at about 0 volt. This means that the voltage rise at the transmitting point A is relatively small at the moment of switching. If a receiving gate is connected near the point A, a relatively high voltage is provided to the input of such a gate at the moment of switching, which voltage may be erroneously interpreted by the receiving gate. The voltage which characterizes the unambiguous desired information bit does, however, appear at a later time; therefore, the transit time of the signal on the line SL is increased. A transmitting gate according to the present invention overcomes the foregoing disadvantage through the separation of the transmitting states of the gate from its state of rest or idle state. It is therefore possible to render the gate effective with a low output impedance during times of signal transmission and a high output impedance at other times. In the case just discussed, a voltage is impressed at a transmission point for both logical states; the voltage jump at the transmission point at the moment of switching is therefore not exclusively determined by the transmitting gate.

Figure 3:
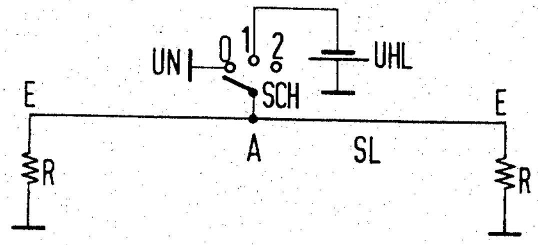
FIG. 3 is an equivalent schematic diagram of a three-state transmission gate connected to a data distribution line.

An exemplary embodiment of the invention is illustrated in FIG. 3. The distribution line SL is again terminated at its ends E by the resistors R. The output of the transmitting gate is connected to a transmission point A. The equivalent circuit diagram of the transmitting gate therefore consists of the voltage source UHL, another voltage source UN and the multi-position switch SCH which illustrates the three possible output states of the transmitting gate. If the switch SCH is in position 1, the voltage UHL is connected to the transmission point A. In such a case, a binary 1, for example, is transmitted. If a binary 0 is desired to be transmitted, the switch SCH is manipulated into the position 0. Then the voltage UN is applied to the transmission point A. Thus, if an information bit is transmitted (first and second output states of the transmitting gate), a voltage is impressed at the transmission point A and the output impedance of the gate is of a small value. If there is to be no transmission, the switch SCH is brought into the position 2, which is an open circuit connection defining the third output state of the transmitting gate. The transmitting gate therefore has a higher output impedance in its third output state. Therefore, if the transmitting gate is switched from its first output state into its second output state, the voltage rise at the transmission point A is determined by the voltage sources UHL and UN. Thus, a voltage jump which corresponds to this voltage rise extends along the distribution line SL. Receiving gates which are connected to the distribution line SL therefore receive this voltage jump after a shorter transit time than in the case of the circuit according to FIG. 2.

Figure 4:
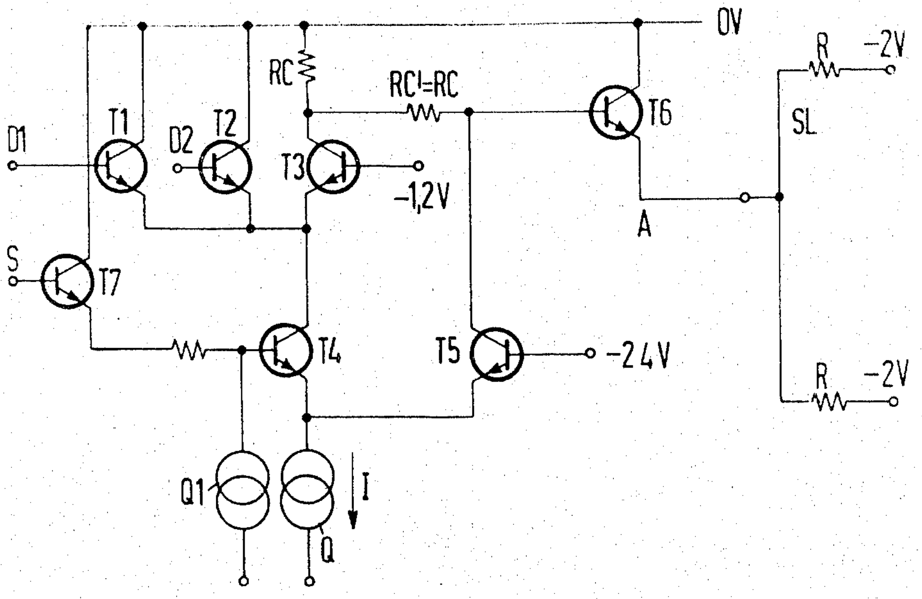
FIG. 4 is a schematic circuit diagram of a transmitting gate which may be utilized in the circuits according to FIGS. 1 and 3.

A circuit realization of a transmitting gate which may be utilized in the arrangement of FIG. 3 is illustrated in FIG. 4 using ECL techniques. The circuit comprises a differential amplifier which includes a pair of transistors T2 and T3. The transistor T2 is a data controlled transistor and has connected in parallel therewith a similar controlled transistor T1. Therefore, in this particular circuit, either of the transistors T1 and T2 may be controlled by respective input signals at their bases D1 and D2. An emitter follower circuit including a transistor T6 is connected to the transistor T3 of the differential amplifier. This connection is effected by way of a resistor RC' which is serially interposed between the base of the transistor T6 and the collector of the transistor T3. The emitter of the transistor T6 is connected to the distribution line SL and therefore forms the transmission point A. The base of the uncontrolled transistor T3 is connected to a fixed potential, here −1.2V.

A second differential amplifier is provided which comprises a pair of transistors T4 and T5 and an input transistor T7. The transistor T7 is connected as an emitter follower circuit wherein its base serves as a control signal input S and its emitter is resistively connected to the base of the transistor T4. The transistor T4 is therefore a controlled transistor and the uncontrolled transistor T5 has its base connected to a fixed potential, here −24V, and its collector connected to the base of the emitter follower transistor T6. The collector of the controlled transistor T4 is connected to the emitters of the transistors T1, T2 and T3 of the first differential amplifier. The emitters of the transistors T4 and T5 are connected to a voltage source Q. A constant current source Q1 is connected to the base of the controlled transistor T4. The collectors of the transistors T7, T1, T2 and T3 are connected to a fixed potential, here O V, the collector of the transistor T3 being so connected by way of a resistor RC.

The distribution line is terminated at each end with a respective resistor R, which in each case is connected to a fixed potential, here −2 V.

The inputs D1 and/or D2 of the transistors T1 and/or T2 are provided with the binary data signals and the input S of the transistor T7 is provided with the control signals.

The three output states of the transmitting gate can be obtained corresponding to the following truth table.

If the control signal $S = 0$ and the data signal is 0 or 1, the transmitting gate is in its idle condition, the gate is blocked and its output impedance is high. If the control signal and the data signal are 0, a binary 0 is transmitted; if the control signal is 1 and the data signal is 1, a binary 1 will be transmitted. In both of the latter cases, the gate is open and the output impedance thereof is low.

In the case $S = 1$, the transistor T5 is blocked and a current I flows through the differential amplifier formed by the transistors T1, T2 and T3. Thus, the circuit operates like a normal ECL - OR gate with the inputs D1 and D2 and the output A. In both states, at the point A, so much emitter current flows through the transistor T6, that the internal impedance seen at the output thereof remains small.

In the case where $S = 0$, the current I flows by way of the transistor T5, and produces a voltage drop at the resistors RC and RC′ which is effective to lock the transistor T6 of the emitter follower and present a high value of output impedance at the point A.

Figure 5:
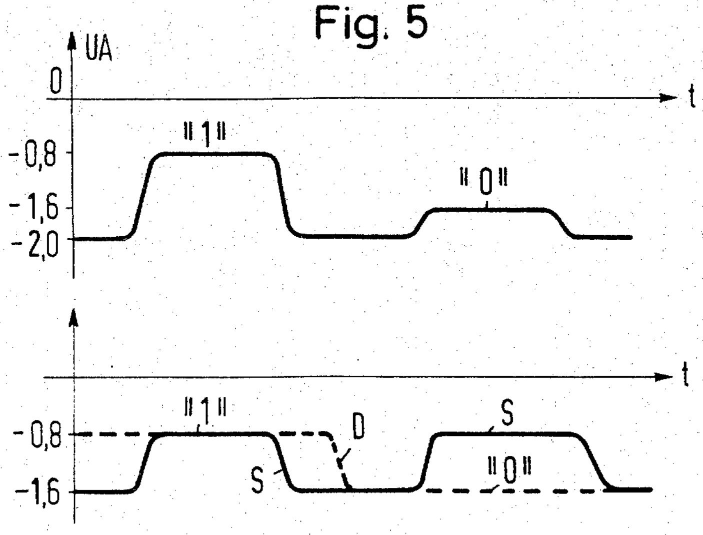
FIG. 5 is a pulse diagram illustrating the output voltages and input signals with respect to time for a circuit such as illustrated in FIG. 4.

FIG. 5 illustrates a pulse diagram for a circuit operating in accordance with the above principles. In FIG. 5, the output voltages UA with respect to time *t* are shown in heavy lines arranged one above the other, and the voltages of the data signal D and the control signal S are also shown in heavy lines over the time axis. The information bits 1 and 0 are provided on the pulse diagram to illustrate the conditions of the output of the transmitting gate with respect to signal conditions at its inputs.

While I have described my invention by reference to a specific illustrative embodiment thereof, many changes and modifications thereof may become apparent to those skilled in the art without departing from the spirit and scope of my invention, and it is to be understood that I intend to include within the patent warranted hereon all such changes and modifications as may reasonably and properly be included within the scope of my contribution to the art.

I claim:

1. In a distribution line arrangement of the type wherein a plurality of transmitting gates and a plurality of receiving gates are connected to a distribution line and the transmitting gates are respectively individually operable to place data on the distribution line, the improvement comprising the provision of each transmitting gate as a circuit including means controllable to effect three possible gate output states in which two of said output states are characterized by a low impedance and the respective gate is operable to transmit data to the distribution line and the third output state is characterized by a high output impedance to prevent loading of subsequently connected circuits and the respective gate is not operable to transmit data to the distribution line.

2. In a distribution line arrangement of the type wherein a plurality of transmitting gates and a plurality of receiving gates are connected to a distribution line and the transmitting gates are respectively individually operable to place data on the distribution line, the improvement comprising the provision of each transmitting gate as a circuit including means controllable to effect three possible gate output states, two of said output states being characterized by a low impedance and the third output state being characterized by a high output impedance, wherein a transmitting gate comprises: six transistors each having a base, an emitter, and a collector; first and second ones of said transistors connected as a first differential amplifier with the base of said first transistor serving as a data input and the base of said second transistor connected to a first supply potential, the collectors of said first and second transistors connected to a second supply potential; a third one of said transistors having its collector connected to the second supply potential, its emitter connected to the distribution line to form an emitter follower circuit, and its base connected to the collector of said second transistor; the base of a fourth one of said transistors serving as a control signal input, the collector of said fourth transistor connected to the second supply potential; a constant current source; fifth and sixth ones of said transistors connected as a second differential amplifier with the base of said fifth transistor connected to the emitter of said fourth transistor and to said constant current source, the collector of said fifth transistor connected to the emitters of said first and second transistors, the emitters of said fifth and sixth transistors connected to a third supply potential, the base of said sixth transistor connected to a fourth supply potential, and the collector of said sixth transistor connected to the base of said third transistor and operable to block and unblock said third transistor in response to the application of control signals to the base of said fourth transistor.

3. The improvement set forth in claim 2, comprising a first resistor interposed between the collector of said second transistor and the second supply potential and a second resistor equal in value to said first resistor and interposed between the collector of said second transistor and the base of said third transistor for developing potentials to block and unblock said third transistor.

* * * * *